(12) United States Patent
Zhao et al.

(10) Patent No.: US 11,070,521 B2
(45) Date of Patent: Jul. 20, 2021

(54) APPLICATION ATTACHMENT BASED FIREWALL MANAGEMENT

(71) Applicant: VMware, Inc., Palo Alto, CA (US)

(72) Inventors: YiSan Zhao, Beijing (CN); Shengbo Teng, Beijing (CN); Jian Lan, Beijing (CN); Nan Wang, Beijing (CN); Wen Wang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 215 days.

(21) Appl. No.: 15/591,538

(22) Filed: May 10, 2017

(65) Prior Publication Data

US 2018/0332006 A1  Nov. 15, 2018

(51) Int. Cl.
*G06F 21/00* (2013.01)
*H04L 29/06* (2006.01)

(52) U.S. Cl.
CPC ........ *H04L 63/0263* (2013.01); *H04L 63/104* (2013.01)

(58) Field of Classification Search
CPC ............... H04L 63/0263; H04L 63/104; G06F 9/45558; G06F 2009/45587
See application file for complete search history.

(56) References Cited

U.S. PATENT DOCUMENTS

| | | | |
|---|---|---|---|
| 2013/0091183 A1* | 4/2013 | Edwards | G06F 3/0631 707/803 |
| 2015/0207879 A1* | 7/2015 | Conover | G06F 9/45558 709/216 |
| 2016/0191463 A1* | 6/2016 | Mohanty | H04L 63/0227 726/11 |
| 2016/0330286 A1* | 11/2016 | Keith | H04L 67/28 |
| 2017/0140017 A1* | 5/2017 | Adoc, Jr. | G06F 17/30345 |
| 2018/0176102 A1* | 6/2018 | Bansal | H04L 43/026 |

\* cited by examiner

*Primary Examiner* — Anthony D Brown
*Assistant Examiner* — Rodman Alexander Mahmoudi (57) ABSTRACT

Described herein are systems, methods, and software to enhance network traffic management for virtual machines. In one implementation, a network policy controller may maintain firewall rules at one or more hosts of a computing environment, wherein the firewall rules define network packet forwarding policies for application groups available to virtual machines in the environment. The network policy controller further identifies an application group for attachment to one or more virtual machines, and in response to the identification, adds the one or more virtual machines to a security group for a firewall wall rule corresponding to the application group.

17 Claims, 7 Drawing Sheets

| APPLICATION GROUPS 510 (SECURITY GROUPS) | APPLICATIONS 512 | DESTINATIONS 514 | SERVICE 516 | ACTIONS 518 |
|---|---|---|---|---|
| GROUP A 530 | APPLICATION A 540 | DESTINATION | SERVICE | ACTION |
| | APPLICATION B 541 | DESTINATION | SERVICE | ACTION |
| GROUP B 531 | APPLICATION A 540 | DESTINATION | SERVICE | ACTION |
| | APPLICATION C 542 | DESTINATION | SERVICE | ACTION |
| | APPLICATION D 543 | DESTINATION | SERVICE | ACTION |
| GROUP C 532 | APPLICATION E 544 | DESTINATION | SERVICE | ACTION |
| GROUP D 533 | APPLICATION F 545 | DESTINATION | SERVICE | ACTION |

DATA STRUCTURE 500

FIGURE 5

| APPLICATION GROUPS 510 (SECURITY GROUPS) | VIRTUAL MACHINES 620 | VIRTUAL MACHINES 621 | VIRTUAL MACHINES 622 |
|---|---|---|---|
| GROUP A 530 | VM 630 | VM 631 | |
| GROUP B 531 | VM 631 | VM 632 | |
| GROUP C 532 | VM 630 | | |
| GROUP D 533 | VM 632 | VM 633 | VM 634 |

DATA STRUCTURE 600

APPLICATION ATTACHMENT BASED FIREWALL MANAGEMENT

BACKGROUND

In virtual desktop environments, host computers may execute a plurality of virtual machines that can be accessed as a service by end users for traditional desktop computing tasks. These users may login to the service via end user devices and, in response to the login, be provided with a virtual machine to accomplish desired tasks. Once the user logs out of the service or the virtual machine, the service may allocate the same virtual machine to a new requesting user.

Although this service model allows multiple users to access virtual machines and the applications available thereon, each of the users may require a different set of applications. For example, an engineer of an organization may require a different set of applications than a financial officer of the same organization. To provide the required applications, the service may identify applications required for a user, and mount or attach application volumes to the virtual machine allocated to the user to make the applications executable from the storage volumes. An application volume may be considered a containerized, or virtualized, application stored in a virtual disk. When the virtual disk is attached to the virtual machine, an agent running on the virtual machine overlays the containerized application on the native file structure so that the containerized application appears to be natively installed onto the disk of the virtual machine. In some implementations, this attachment process may modify any required registry information of the virtual machine to make the applications executable from the application volumes.

Once the application volumes are attached, the user may execute the applications located in the attached volumes as if the applications were locally installed on the virtual machine. However, although applications may be attached via application volumes, it is often difficult to manage the inbound and outbound network traffic associated with the virtual machine. In particular, because different applications may be attached and made available on a virtual machine based the current requirements of the virtual machine, it is often difficult to configure firewall and network management resources for the particular applications.

OVERVIEW

The technology disclosed herein enhances the management of firewall rules for virtual machines based on applications attached to the virtual machines. In one implementation, a method of operating a network policy controller to manage firewall rules for virtual machines in a computing environment includes maintaining one or more firewall rules for one or more application groups at one or more host computing systems, wherein each firewall rule defines forwarding policies corresponding an application group of the one or more application groups available for attachment to the virtual machines. The method further includes identifying an application group for attachment to one or more virtual machines of the virtual machines. The method also provides, in response to identifying the application group for attachment, adding the one or more virtual machines to a security group for a firewall rule corresponding to the application group.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The various examples disclosed herein provide enhancements for application attachment based firewall management. In many situations, virtual machines provide a centralized computing platform for one or more end users to access and execute desired applications and operations. To provide each of the end users with the required applications, and prevent access to unnecessary applications, one or more application volumes are made available in the virtual environment that are capable of being attached to the individual virtual machines. These application volumes may include, but are not limited to, virtual machine disks (VMDKs), virtual hard disks (VHDs), or some other virtual disk file capable of storing applications for execution on the virtual machines.

To make the applications available to each individual user, an application attach service may be employed that acts as a volume manager that initiates the attachment of application volumes to the individual virtual machines. For example, a user may, via an end user device, initiate a service login to initiate a virtual computing session. This service login may be accomplished using a dedicated application on the end user device, a web browser interface on the end user device, or any other similar interface on the end user device. Responsive to the service login, the virtual computing service may identify an available virtual machine to allocate to the end user, and initiate a user login process to log the end user into the virtual machine. Additionally, the service may identify one or more storage volumes associated with the user and attach the one or more storage volumes to virtual machine. Once attached and the user is logged into the virtual machine, the user may execute any of the applications from the attached storage volumes. Although this is one example of when storage volumes may be attached to a virtual machine, it should be understood that volumes may be attached by other mechanisms. For example, an administrator of a computing environment may define one or more virtual machines to be allocated a set of applications that are available in one or more storage volumes. Additionally, an agent executing inside the virtual machine may request the application service to attach one or more applications via attachable storage volumes.

To attach the storage volumes to the virtual machine, the virtual computing service may initiate a process to mount the volumes to the allocated virtual machine for the end user, and overlay the contents of the volumes to make the one or more applications within the volumes executable by the virtual machine. In some examples, mounting a volume to the virtual machine may include providing an access path and mount point for the volume to the virtual machine, which may comprise an internet protocol (IP) address, a directory name, a file name, or any other path information to access the contents of the particular volume. Once mounted, the contents of the volume may be overlaid within the virtual machine to make the application executable. This overlaying may include modifying registry keys to make the application executable from the attached volume, as well as modifying the file structure to make the application appear as though it has been locally installed. For example, when an application storage volume is attached to a virtual machine, the files and directories for the application may appear in the "C:\Program Files" directory, although the executable file components remain stored in the attached volume.

In some implementations, administrators may manage and perform installation processes to store the applications in the application volumes. These installation processes may extract the necessary files and registry keys from an installer, and store the files and registry key files to an appropriate application storage volume. In some examples, the administrator may define application stacks, or groups of applications that are capable of assignment, and provide these groups of applications in one or more application volumes. For example, a first application group may include productivity applications to be supplied to a first set of end users, and a second application group may include video and image editing software to be provided to a second set of end users. Once the applications are stored within the application volumes, the administrator may define which of the applications or volumes are associated with requesting end users.

Here, in addition to managing the applications and volumes that should be attached to each of the virtual machines, a network policy controller may also be used to manage firewall rules for each of the virtual machines. In particular, in addition to generating the application volumes that correspond to the application groups, an administrator may also define a firewall rule for each of the application groups, wherein each firewall rule defines network packet forwarding polices for applications in the corresponding application group. For example, a forwarding rule for a productivity application group may define which services a text editing application, a presentation application, and the other productivity application may communicate with. These communications may comprise communications with an update server, communications with a template server, or some other similar type of communications. In many implementations, the security rules may comprise a source security group, which virtual machines may be added to when a corresponding application group is attached to the virtual machines, destination addresses for the applications, services associated with the destination addresses, and forwarding actions for communications involving the addresses and destinations (permit, block, etc.). For example, referring to the productivity application group, if a virtual machine has been allocated the application group, the virtual machine may be added to the source security group permitting the communication policies to be applied to the virtual machine. In contrast, if the virtual machine has not been allocated the productivity application group, the virtual machine will not be added to the security group preventing the virtual machine from using the communication policies.

As the firewall rules are generated, the rules may be distributed or maintained at each of the hosts within the computing environment, such that the rules may be implemented as required for virtual machines operating on the respective hosts. While the firewall rules are maintained, the network policy controller may identify a group of applications for attachment to one or more virtual machines in the computing environment. In some implementations, to identify the application group for attachment, the network policy controller may receive a notification from the application attach service that is responsible for initiating the attachment of storage volumes to the virtual machines. This notification may be provided in response to new volumes being attached, may be provided at a time interval, may be provided based on a request from the network policy controller, or maybe provided at any other instance. Once the network policy controller is notified of the attachment, the controller adds the one or more virtual machines associated with the attachment to a firewall rule corresponding to the application group.

Figure 1:
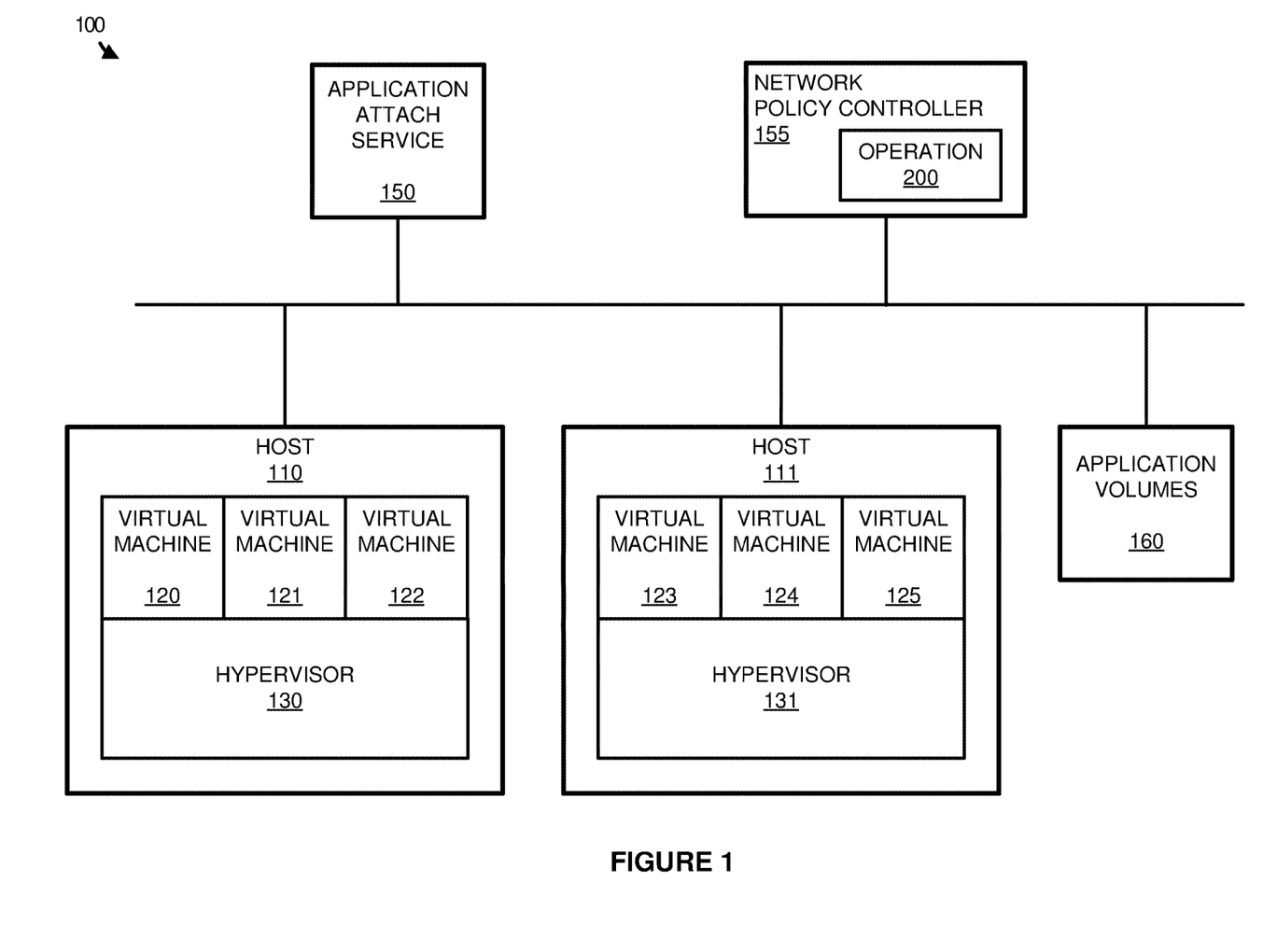
FIG. 1 illustrates a computing environment to manage firewall configurations for virtual machines according to an implementation.

FIG. 1 illustrates a computing environment 100 to manage firewall configurations for virtual machines according to an implementation. Computing environment 100 includes application attach service 150, network policy controller, hosts 110-111, and application volumes 160. Application volumes 160 comprise virtual disks that are accessible to hosts 110-111, and may be stored on a serving computer, desktop computer, or some other type of storage device. Although illustrated as separate from hosts 110-111 it should be understood that application volumes 160 may reside wholly or partially on hosts 110-111.

In operation, hosts 110-111 execute hypervisors 130-131 to provide a platform for virtual machines 120-125. Hypervisors 130-131 abstract the components of the physical hosts to provide virtual components to virtual machines 120-125, which may include processing systems, network interfaces, or other similar elements. In addition to providing the virtual computing elements to the virtual machines themselves, hypervisors 130-131 may also provide software defined networking operations to provide connectivity for the virtual machines. These software defined network operations may include virtual switches, virtual routers, firewalls, and the like, which can be configured dynamically as required for each of the individual virtual machines.

In addition to hosts 110-111, application attach service 150 may be used to allocate and attach applications to virtual machines 120-125. In particular, in response to an attach event, which may comprise a user logging into a service provided by application attach service 150, an administrator request to attach applications to a virtual machine, or some other similar attach event, application attach service 150 will identify one or more volumes associated with the request and initiate an attach process to make the applications available on the required virtual machine. For example, if an administrator requested that a productivity application group be attached to virtual machine 120, application attach service 150 may identify one or more storage volumes in application volumes 160 that contain elements for the applications, and initiate an attachment process for the applications using the volumes. This attachment process may include mounting the volumes to the virtual machine, and overlaying the elements in a file structure to permit the application to be executed on the virtual machine without a local installation on the virtual machine. These elements may include files, libraries, registry keys, and the like for the application.

Figure 2:
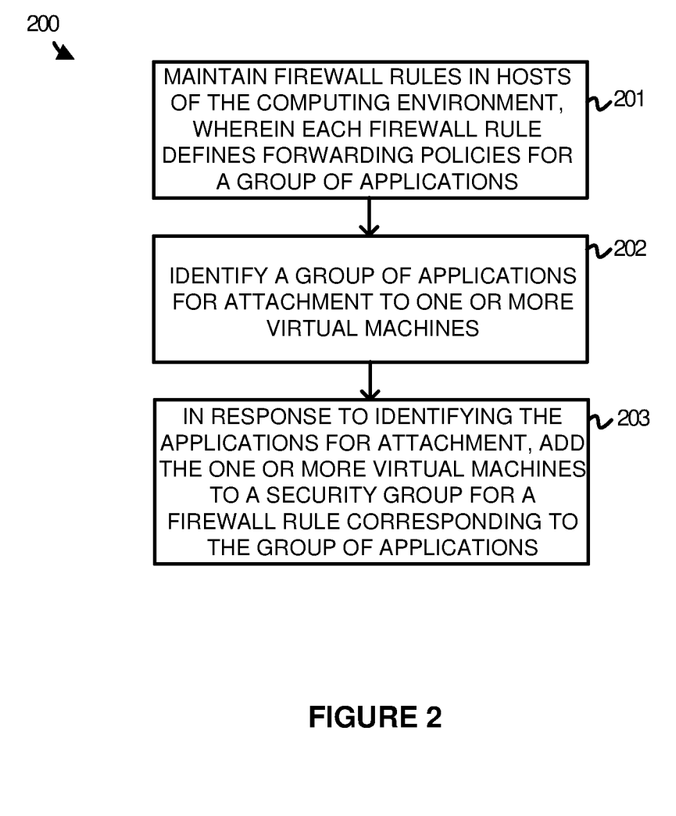
FIG. 2 illustrates an operation to manage firewall configurations for virtual machines according to an implementation.

While application attach service 150 is responsible for attaching applications to the virtual machine, application attach service 150 may also provide information about attached applications to network policy controller 155. Once provided with the information, network policy controller 155 may be responsible for configuring the firewalls for the virtual machines based on the applications that were attached using operation 200.

FIG. 2 illustrates operation 200 to manage firewall configurations for virtual machines according to an implementation. The processes of operation 200 are described parenthetically in the paragraphs that follow with reference to systems and elements of computing environment 100 of FIG. 1.

As depicted, network policy control 155 maintains (201) firewall rules in hosts 110-111, wherein each firewall rule defines forwarding policies for a group of one or more applications. These forwarding policies may each comprise a source security group, which may be dynamically modified to include virtual machines assigned the group of applications, a destination address, a destination service, and a forwarding action for communications associated with the destination and service. As an example, a virtual machine that has a cloud storage application attached may be permitted to communicate with (e.g. send network packets to or receive network packets from) a particular domain to provide a desired service for the application, such as monitoring for file modifications. Although these are examples of what may be included in a forwarding policy, it should be understood that other elements may be included in a forwarding policy. In some implementations, to define the forwarding rules, an administrator may provide user input to generate the rules for each application group. Once defined, network policy controller 155, may distribute the rules to each host of hosts 110-111 in the computing environment.

In addition to maintaining the firewall rules at the host systems, operation 200 further directs network policy controller 155 to identify (202) a group of applications for attachment to one or more virtual machines. To identify the attachment, network policy controller 155 may receive application attach notifications from application attach service 150 and/or hypervisors 130-131 associated with the virtual machines receiving the attached applications. These notifications may be provided in response to a query by network policy controller 155, may be provided at defined intervals, may be provided as the applications are attached, or may be provided at any other interval.

In response to identifying the group of applications for attachment, network policy controller 155 will add (203) the one or more virtual machines to a security group for a firewall rule corresponding to the group of applications. As an illustrative example, if a rule was generated for a productivity application group, and contained forwarding policies for the applications of the group, network policy controller 155 may be responsible for adding virtual machines to the security group associated with the rule. Thus, if virtual machine 120 were to have the productivity applications attached to the virtual machine, network policy controller 155 may add the virtual machine to the security group. Consequently, the forwarding policies associated with the rule for the productivity applications may be applied to virtual machine 120. In some implementations, in adding the virtual machine to the security group, hypervisor 130 may be notified of the addition and implement the policies at a virtual network interface for virtual machine 120. However, it should be understood that the firewall policies may be implemented in other locations of the data path for virtual machine 120.

Figure 3:
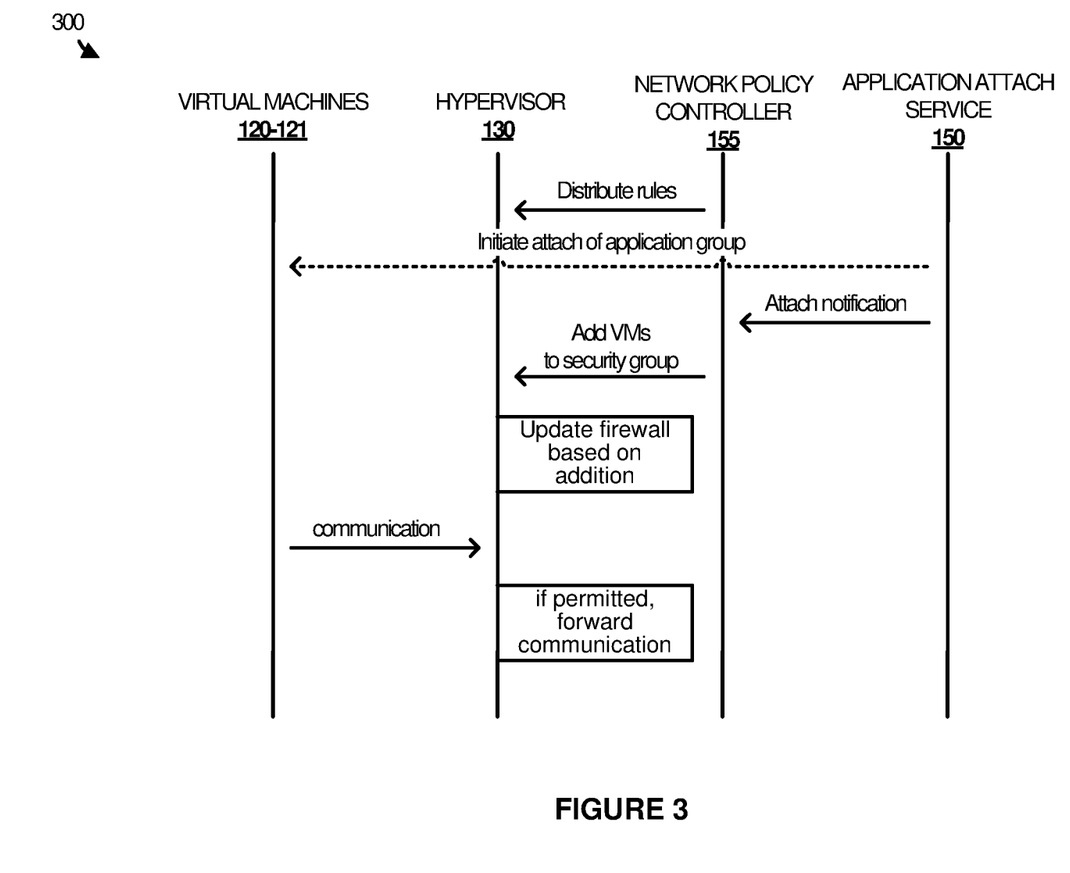
FIG. 3 illustrates a timing diagram of managing firewall configurations for virtual machines according to an implementation.

FIG. 3 illustrates a timing diagram 300 of managing firewall configurations for virtual machines according to an implementation. Operational scenario 300 includes virtual machines 120-121, hypervisor 130, network policy controller 155, and application attach service 150 from computing environment 100 of FIG. 1.

As described herein, network policy center 155 may maintain or distribute firewall rules to hosts and hypervisors of a computing environment, such as hypervisor 130 of host 110. These firewall rules include one or more policies that are used to permit or block communications from virtual machines based on applications that are attached to the virtual machines. In particular, each of the firewall rules may define an open security group, wherein virtual machines may be added to the group as the associated applications are attached. In addition to the security group, the policies of the firewall rule may define destination addresses available for communication from the virtual machines in the security group, services that can be used in communicating with the destination addresses, or any other similar information.

As the rules are distributed to the hypervisors of the computing environment, virtual computing service 150 may detect one or more attach triggering events and initiate attach operations to attach applications to virtual machines 120-121 based on the triggering events. These attach triggering events may occur when a user logs into application attach service 150 and requests a virtual machine, may occur when an administrator requests that applications be attached to virtual machines, or may occur at any other instance. In some implementations, application attach service 150 may be capable of providing a virtual desktop to a requesting end user. Consequently, when the user logs into the service, a virtual machine may be selected and one or more applications assigned to the user may be attached to the virtual machine. This attach process may include identifying one or more storage volumes that store the components for the desired applications, mounting the one or more storage volumes to the virtual machines, and overlaying the components in a file structure for the virtual machine.

Once applications are defined to be attached to virtual machines 120-121, application attach service 150 may provide an attach notification to network policy controller 155. This notification may be provided any time after the attach process is initiated, including waiting to provide the notification until the attach process is completed. After the attach notification is identified by network policy controller 155, network policy controller 155 may add virtual machines (VMs) to the security group associated with the firewall rule corresponding to the group of applications that was attached to virtual machines 120-121. For example, if a cloud storage application were attached as an application group to virtual machines 120-121, then virtual machines 120-121 would be added to the security group associated with the firewall rule for the cloud storage application.

In some implementations, such as the example in timing diagram 300, in adding the virtual machines to the security group, a notification may be distributed to hypervisors of the computing environment to notify the hypervisors of the addition of the virtual machines to the security group. Once distributed, the firewalls for each of the virtual machines may monitor communications based on being assigned to the security group. This monitoring may occur at the virtual network interface for virtual machines 120-121, or at some other network point in the software defined network.

After a communication is identified from one of the virtual machines, the policies that apply to the virtual machine may be used to determine if the communication is permitted. This determination may be made based on the service making the request, the destination address of the request, or some other information identified from the communication request. If permitted, the communication may be forwarded to the appropriate end destination. Returning to the example of the cloud storage application, if a service for the cloud storage application is attempting to communicate with a server for the cloud storage application then the communication may be permitted. However, if the communication is not directed to a permitted destination address or an unknown service is making the request, then the communication may be blocked for the virtual machine.

Figure 4:
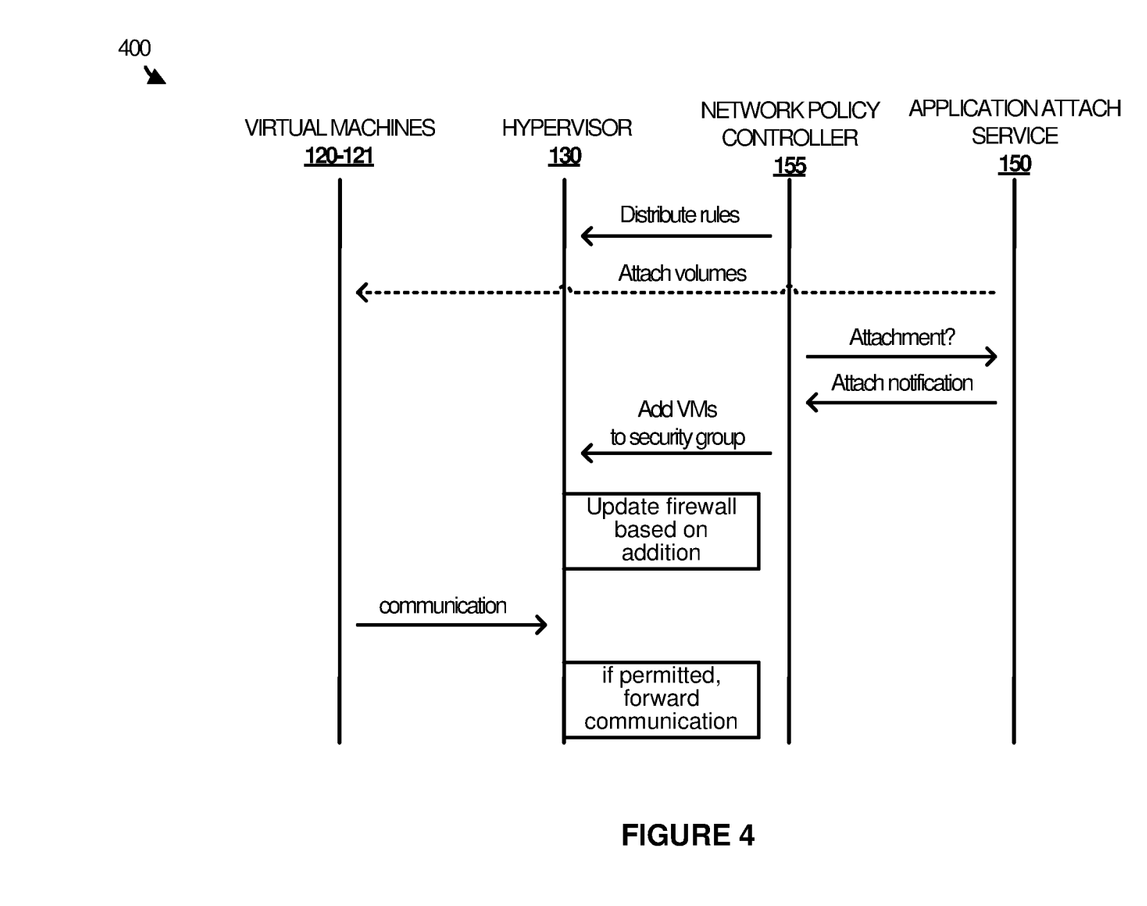
FIG. 4 illustrates a timing diagram of managing firewall configurations for virtual machines according to an implementation.

FIG. 4 illustrates a timing diagram 400 of managing firewall configurations for virtual machines according to an implementation. Operational scenario 300 includes virtual machines 120-121, hypervisor 130, network policy controller 155, and application attach service 150 from computing environment 100 of FIG. 1.

Timing diagram 400 includes many of the same operations as described in operational scenario 300 of FIG. 3, however, provides a different mechanism for receiving the attachment notification. In particular, network policy controller 155 distributes or maintains firewall rules at hosts and hypervisors of the computing environment. While maintaining the firewall rules, application attach service 150 may attach applications to virtual machines executing within the environment. To ensure that each of applications is maintaining proper security, network policy controller 155 is provided, which may request, at any interval, attachment information for virtual machines operating within the environment. In response to the request, application attach service 150 may provide a notification to network policy controller 155 indicating which application groups were attached to which virtual machines. In this example, an application group was attached to virtual machines 120-121, and based on this information, network policy controller 155 may add virtual machines 120-121 to the security group associated with a firewall rule for the application group. Once added, in some implementations by providing a notification with identifiers for the virtual machines to hypervisors indicating that the virtual machines have been added to the security group, the communications by virtual machines 120-121 may be forwarded based on the addition to the security group. In particular, when a communication is identified from one of the virtual machines, hypervisor 130 may determine whether to forward the communication based on the policies associated with the applications that were attached.

Figure 5:
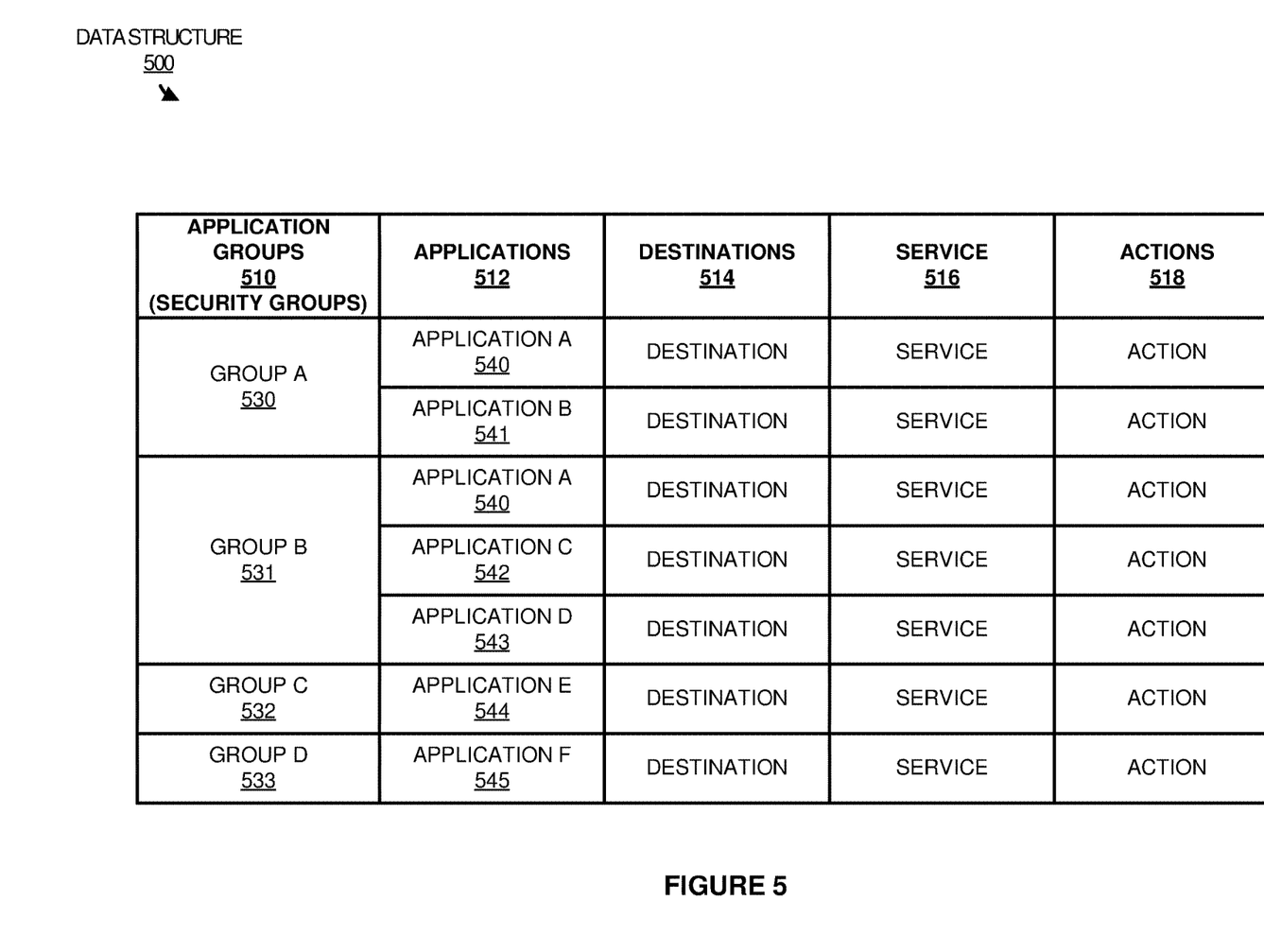
FIG. 5 illustrates a data structure defining firewall rules according to an implementation.

FIG. 5 illustrates a data structure 500 defining firewall rules according to an implementation. Data structure 500 includes columns for application groups 510, applications 512, destinations 514, services 516, and actions 518. Applications groups 510 includes groups 530-533 and applications 512 includes applications 540-545. Although illustrated with five columns in the present implementation it should be understood that additional information and/or columns may be used in defining firewall rules.

As described herein, a network policy controller may be used to manage firewall rules for virtual machines in a computing environment. In particular, the network policy controller may receive user input, via a network interface or directly at the controller, indicative of forwarding policies associated with application groups available for attachment. Once the firewall rules are defined with the appropriate forwarding policies, the rules may be distributed to the hosts to implement the rules as required for each of the virtual machines.

Here, each of the rules is defined by application groups 530-533, wherein each of the groups contains one or more applications that can be attached to a virtual machine. For example, group A 530 includes applications A and B 540-541. When group A 530 is attached to a virtual machine, the network policy controller may receive a notification of the attachment. Responsively, the virtual machine may be added to group A 530, such that the policies in the group A 530 rule will be applied to the virtual machine. Accordingly, when application A 530 makes a communication request with the appropriate destination and service in the policy for application A 530, an action may be performed, such as permitting the communication to occur. Additionally, the virtual machine may be allocated more than one application group, and the virtual machine may be added to the security groups associated with any of the attached applications. Thus, if the virtual machine was also allocated application E 544 of group C 532, then the virtual machine may be added to the security group for group C 532.

In some implementations, when a virtual machine is added to the group, the identifier of the virtual machine may be added to the security group, and a notification may be delivered to hosts in the computing environment to notify them of the addition of the virtual machine. Once notified, the hosts may implement the desired firewall rules for the virtual machine. This implementation may occur at the virtual network interface, the logical port for the virtual switch, or at some other element in the data plane.

Although illustrated as a table in the present implementation, it should be understood that the firewall rules may be maintained in one or more tables, linked lists, arrays, data trees, or some other data structure. Additionally, when provided to the hosts, it should be understood that the hosts may use one or more data structures to manage the firewall rules and the virtual machines associated with each of the rules.

Figure 6:
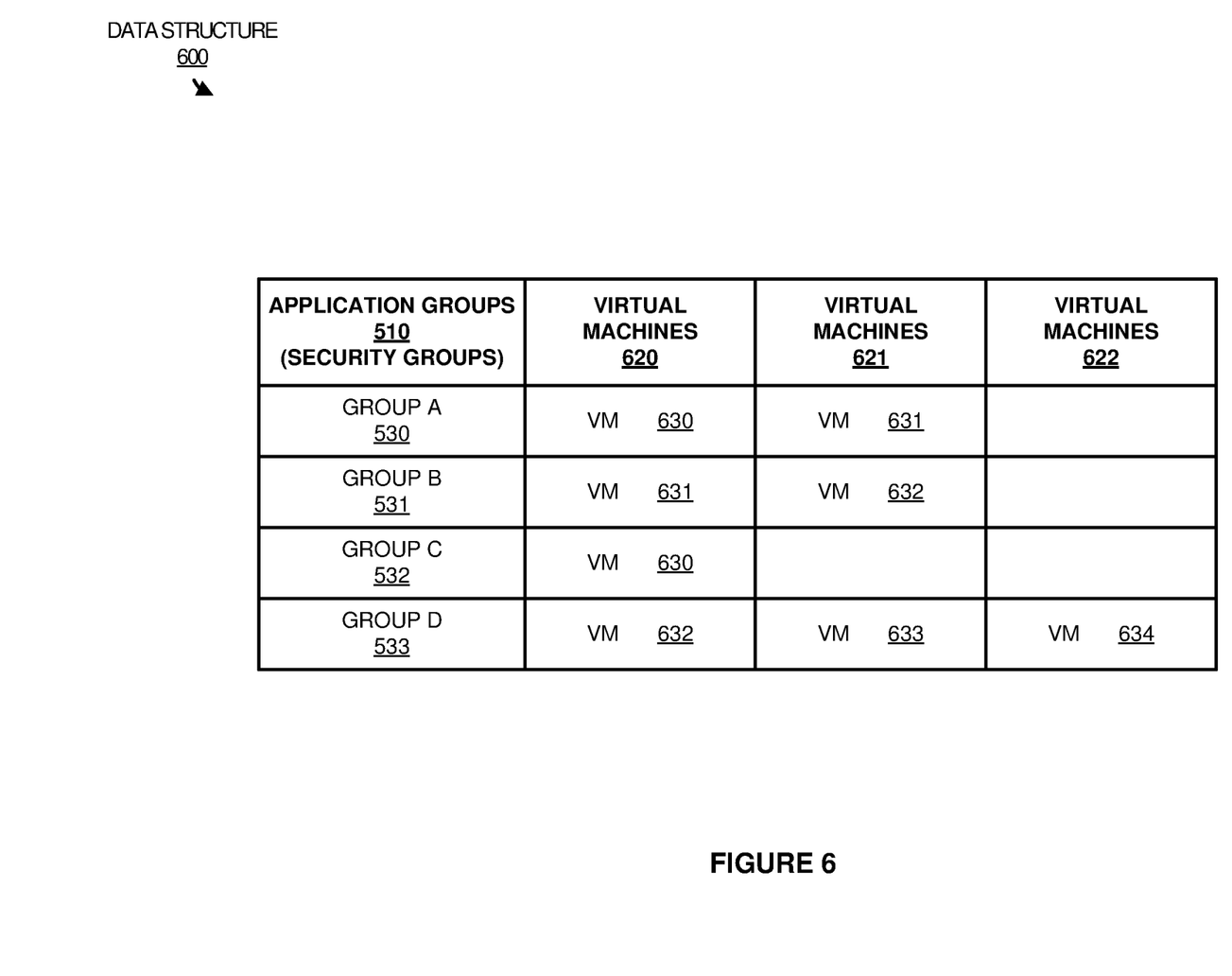
FIG. 6 illustrates a data structure defining allocations of firewall rules according to an implementation.

FIG. 6 illustrates a data structure 600 defining allocations of firewall rules according to an implementation. Data structure 600 includes columns for application groups 510 introduced in data structure 500 of FIG. 5, and virtual machines 620-622, which include virtual machines (VMs) 630-634. Although illustrated as table in the present implementation, it should be understood that one or more data structure may be used in maintaining information about the virtual machine allocation to application or security groups.

As described previously, after the generation of application groups and firewall rules associated with the application groups, virtual machines may be added to the application groups as required. As an example, virtual machine 630 has been allocated applications associated with group A 530 and group C 532. In response to identifying that the virtual machine is being allocated the application groups, which may be provided by an application attach service responsible for initiating the attach operation for the virtual machines, the network policy controller may add the virtual machine to security groups associated with the application group. Thus, virtual machine 630 may be added to the security groups for group A 530 and group C 532.

In some implementations, in adding a virtual machine to a security group, a notification is communicated to at least the host associated with the virtual machine. Responsive to the notification, the host may implement the firewall rule associated with the application group. This implementation may come at the virtual network interface for the virtual machine, the logical port, or at any other element of the data plane for the virtual machine. Accordingly, prior to the attachment of an application, the virtual machine may not be permitted to communicate with a destination network address, however, via the addition of the virtual machine to a firewall rule, the virtual machine may be permitted to communicate with the destination network address.

Although the previous methods and operations described in FIGS. 1-6 provide for the addition of a virtual machine to a security group, it should be understood that similar operations may be used in the removal of a virtual machine from a security group. In particular, in response to a detach triggering event, which may be based on the user logging out of the virtual machine, the administrator removing applications from the virtual machine, or some other event, a notification may be identified by the network policy controller that indicates the removal of one or more application groups. Once the notification is identified, the network policy controller will remove the virtual machine from any security groups associated with the applications. Thus, referring to the example in FIG. 6, if triggering event caused all attached applications to be removed from virtual machine 630, the network policy controller may remove virtual machine 630 from group A 530 and group B 532, which would prevent the associated firewall policies from being implemented for virtual machine 630.

Figure 7:
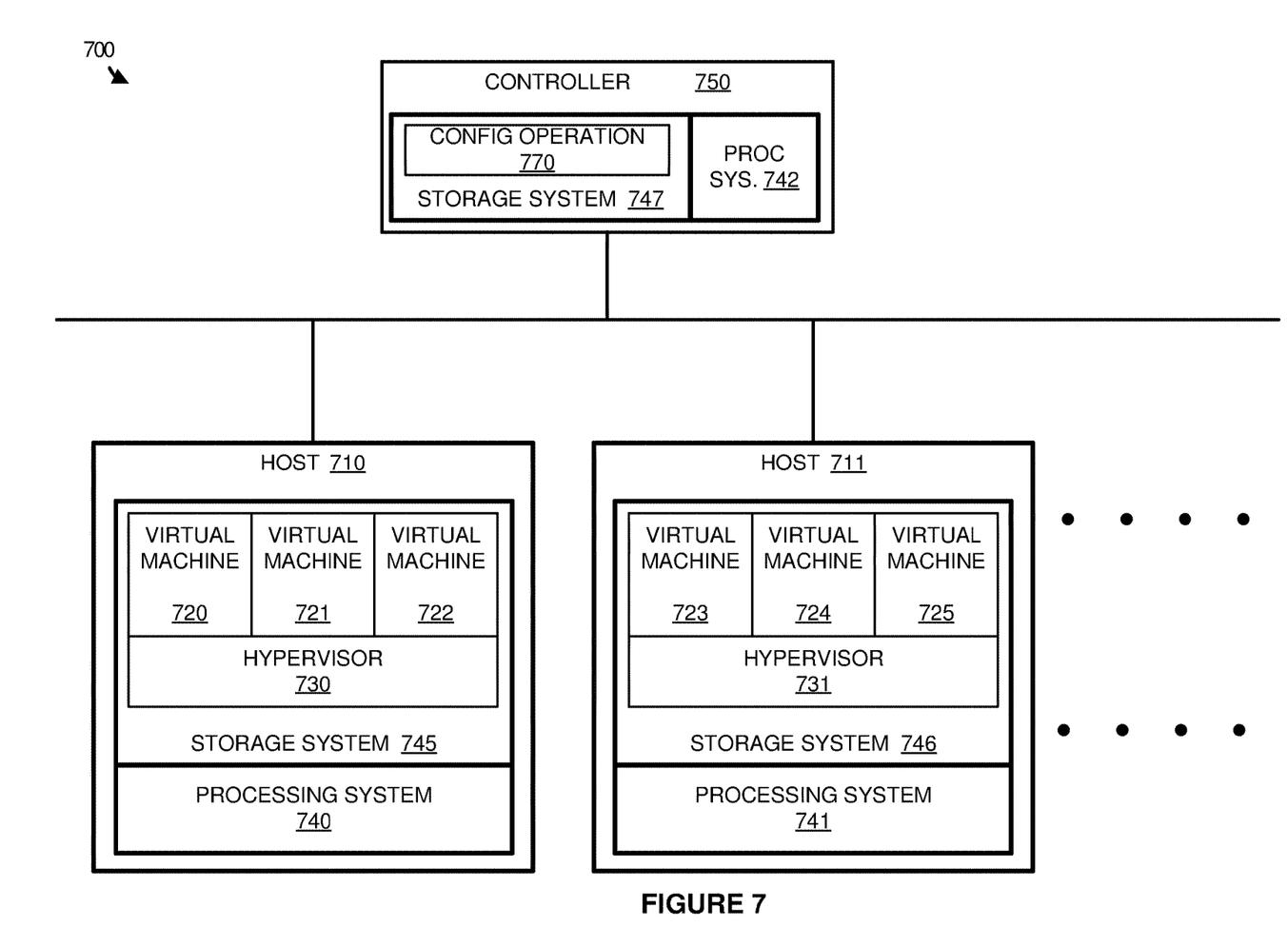
FIG. 7 illustrates a computing environment to manage firewall rule configurations according to an implementation.

FIG. 7 illustrates a computing environment 700 to manage firewall rule configurations according to an implementation. Computing environment 700 is an example deployment of virtual machines, and includes hosts 710-711 and controller 750. Hosts 710-711 may comprise serving computing systems, desktop computing systems, or any other similar type of computing system. Controller 750, which is an example of network policy controller 155 of FIG. 1, may comprise one or more serving computing systems, desktop computing systems, or any other similar type of computing system. Hosts 710-711 and controller 750 include processing systems 740-742, which are operatively coupled to storage systems 745-747, respectively. Although not illustrated in the present example, it should be understood that hosts 710-711 and controller 750 include communication interfaces to provide communication with other computing systems, and in some examples user interfaces to provide user input/output operations. The communication interfaces may be configured to communicate over metallic, wireless, or optical links, and may be configured to use Time Division Multiplex (TDM), Internet Protocol (IP), Ethernet, optical networking, wireless protocols, communication signaling, or some other communication format—including combinations thereof.

Processing systems 740-742 each comprise microprocessor and other circuitry that retrieves and executes software from corresponding storage systems 745-747. Storage systems 745-747 may each include volatile and nonvolatile, removable and non-removable media implemented in any method or technology for storage of information, such as computer readable instructions, data structures, program modules, or other data. Storage systems 745-747 may each be implemented as a single storage device, but may also be implemented across multiple storage devices or sub-systems. Storage systems 745-747 may comprise additional elements, such as a controller to read operating software. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

In operation, hypervisors 730-731 when read and executed by processing systems 740-741 provide a platform for executing virtual machines 720-725. In particular, hypervisors 730-731 may be responsible for abstracting physical components of a computing system and providing the components as virtual components to each virtual machine of virtual machines 720-725. These components may include processing systems, network interfaces, and other similar computing components. In addition to providing the components to virtual machines 720-725, hypervisors 730-731 also provide software defined networking operations to the virtual machines. This software defined networking operations includes identifying data communications to and from virtual machines 720-725 and forwarding the communications based at least on firewall rules and updates provided from controller 750.

To manage the firewall rules and allocation of virtual machines in the rules, configuration operation 770 is provided that, when read and executed by processing system 742, directs processing system 742 to configure the firewall rules on hosts 710-711 using operations similar to those described in operation 200 of FIG. 2. In particular, configuration operation 770 may direct processing system 742 to maintain the firewall rules on each of hosts 710-711. These firewall rules each include one or more policies wherein virtual machines may be added and permitted to communicate with an address using a particular service. For example, an update service for an application may require communications with a particular domain name. Accordingly, the firewall rules may permit or deny communications based on whether virtual machine has been allocated the application via storage volumes (not pictured).

As the firewall rules are maintained for hosts 710-711, configuration operation 770 directs processing system 742 to identify a group of applications to be attached to one or more virtual machines of virtual machines 720-725. For example, although not illustrated, controller 750 may identify a notification from a volume attach service that a suite of productivity applications is to be attached to virtual machines 720-721. Once the applications are identified for attachment, which may occur prior to, during, or after the completion of the attachment process, configuration operation 770 further directs processing system 742 to add the one or more virtual machines to a security group for a firewall rule corresponding to the group of applications. Returning to the example of the suite of productivity applications being attached to virtual machines 720-721, controller 750 may direct at least host 710 to add virtual machines 720-721 to a security group associated with the firewall rule for the suite of applications. Once added to the group, hypervisor 720 may apply the firewall rule and the associated policies to communications to and from virtual machines 720-721.

Although only illustrated in the example of FIG. 7 with two host computing systems, it should be understood that any number of host computing systems may be employed within a computing environment. Moreover, while not illustrated in controller 750 or hosts 710-711, it should be understood that each system may include a user interface that permits a user to receive user inputs and to present media and/or information. Each of the user interfaces may include a speaker, microphone, buttons, lights, display screen, touch screen, touch pad, scroll wheel, communication port, or some other user input/output apparatus—including combinations thereof. For example, a user interface may be used by controller 750 to receive rule configurations from an administrator of computing environment 700. However, it should be understood that the input may also be provided via the communication interface to an external peripheral (mouse, keyboard, and the like), or from an external command console (desktop computer, laptop computer, tablet, and the like) in communication with controller 750.

Additionally, while illustrated as a separate system, it should be understood that the operations of controller 750 may be implemented wholly or partially on hosts 710-711.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of managing firewall rules for virtual machines in a computing environment, the method comprising:
    maintaining firewall rules for application groups available for attachment to the virtual machines on one or more host computing systems, wherein each firewall rule of the firewall rules defines network packet forwarding policies corresponding to an application group of the application groups, wherein each of the application groups comprises at least one application available for attachment, and wherein at least one of the application groups comprises two or more applications available for attachment;
    identifying an application group of the application groups for attachment to one or more virtual machines of the virtual machines, wherein the attachment of the application group comprises mounting one or more storage volumes that store the application group to the one or more virtual machines and overlaying contents of the one or more storage volumes to appear in a local disk for each of the one or more virtual machines to make the application group executable by the one or more virtual machines, and wherein the one or more storage volumes comprise one or more virtual disks; and
    in response to identifying the application group for attachment, adding the one or more virtual machines to a security group for a firewall rule of the firewall rules associated with the application group to apply network packet forwarding polices corresponding to the application group to communications associated with the one or more virtual machines.

2. The method of claim 1, wherein identifying the application group for attachment to the one or more virtual machines comprises receiving a notification from an application attach service that indicates the application group for attachment to the one or more virtual machines.

3. The method of claim 2 further comprising transferring a request to the application attach service for an application attachment update and wherein the notification is provided in response to the request.

4. The method of claim 1, wherein each of the application groups is stored in one or more storage volumes available for mounting to the virtual machines.

5. The method of claim 1, wherein each network packet forwarding policy comprises a source security group, a destination address, a service, and an action.

6. The method of claim 1 further comprising receiving user input defining the one or more firewall rules.

7. A computing apparatus comprising:
    one or more non-transitory computer readable storage media;
    a processing system operatively coupled to the one or more non-transitory computer readable storage media; and
    program instructions stored on the one or more non-transitory computer readable storage media to manage firewall rules for virtual machines in a computing environment that, when read and executed by the processing system, direct the processing system to at least:
        maintain firewall rules for application groups available for attachment to the virtual machines on one or more host computing systems, wherein each firewall rule of the firewall rules defines network packet forwarding policies corresponding to an application group of the application groups, wherein each of the application groups comprises at least one application available for attachment, and wherein at least one of the application groups comprises two or more applications available for attachment;
        identify an application group of the application groups for attachment to one or more virtual machines of the virtual machines, wherein the attachment of the application group comprises mounting one or more storage volumes that store the application group to the one or more virtual machines and overlaying contents of the one or more storage volumes to appear in a local disk for each of the one or more virtual machines to make the application group executable by the one or more virtual machines, and wherein the one or more storage volumes comprise one or more virtual disks; and
        in response to identifying the application group for attachment, add the one or more virtual machines to a security group for a firewall rule of the firewall rules associated with the application group to apply network packet forwarding polices corresponding to the application group to communications associated with the one or more virtual machines.

8. The computing apparatus of claim 7, wherein the program instructions to identify the application group for attachment to the one or more virtual machines direct the processing system to receive a notification from an application attach service that indicates the application group for attachment to the one or more virtual machines.

9. The computing apparatus of claim 8, wherein the program instructions further direct the processing system to transfer a request to the application attach service for an application attachment update, wherein the notification is provided in response to the request.

10. The computing apparatus of claim 7, wherein each of the application groups is stored in one or more storage volumes available for mounting to the virtual machines.

11. The computing apparatus of claim 7, wherein each network packet forwarding policy comprises a source security group, a destination address, a service, and an action.

12. The computing apparatus of claim 7, wherein the program instructions further direct the processing system to receive user input defining the one or more firewall rules.

13. An apparatus comprising:
one or more non-transitory computer readable storage media;
program instructions stored on the one or more non-transitory computer readable storage media to manage firewall rules for virtual machines in a computing environment that, when read and executed by a processing system, direct the processing system to at least:
maintain firewall rules for application groups available for attachment to the virtual machines on one or more host computing systems, wherein each firewall rule of the firewall rules defines network packet forwarding policies corresponding to an application group of the application groups, wherein each of the application groups comprises at least one application available for attachment, and wherein at least one of the application groups comprises two or more applications available for attachment;
identify an application group of the application groups for attachment to one or more virtual machines of the virtual machines, wherein the attachment of the application group comprises mounting one or more storage volumes that store the application group to the one or more virtual machines and overlaying contents of the one or more storage volumes to appear in a local disk for each of the one or more virtual machines to make the application group executable by the one or more virtual machines, and wherein the one or more storage volumes comprise one or more virtual disks; and
in response to identifying the application group for attachment, add the one or more virtual machines to a security group for a firewall rule of the firewall rules associated with the application group to apply network packet forwarding polices corresponding to the application group to communications associated with the one or more virtual machines.

14. The apparatus of claim 13, wherein each of the application groups is stored in one or more storage volumes available for mounting to the virtual machines.

15. The method of claim 1, wherein overlaying the contents of the one or more storage volumes in the one or more virtual machines to make the application group executable by the one or more virtual machines comprises overlaying the contents in a file structure for each of the one or more virtual machines.

16. The computing apparatus of claim 7, wherein overlaying the contents of the one or more storage volumes in the one or more virtual machines to make the application group executable by the one or more virtual machines comprises overlaying the contents in a file structure for each of the one or more virtual machines.

17. The apparatus of claim 13, wherein overlaying the contents of the one or more storage volumes in the one or more virtual machines to make the application group executable by the one or more virtual machines comprises overlaying the contents in a file structure for each of the one or more virtual machines.

* * * * *